April 2, 1957    J. S. SPEVACK    2,787,526
METHOD OF ISOTOPE CONCENTRATION
Filed Nov. 9, 1943    5 Sheets-Sheet 1

Jerome S. Spevack
INVENTOR.

BY

April 2, 1957   J. S. SPEVACK   2,787,526
METHOD OF ISOTOPE CONCENTRATION
Filed Nov. 9, 1943   5 Sheets-Sheet 4

Jerome S. Spevack
INVENTOR.

BY

Robert A. Lavender

April 2, 1957  J. S. SPEVACK  2,787,526
METHOD OF ISOTOPE CONCENTRATION
Filed Nov. 9, 1943  5 Sheets-Sheet 5
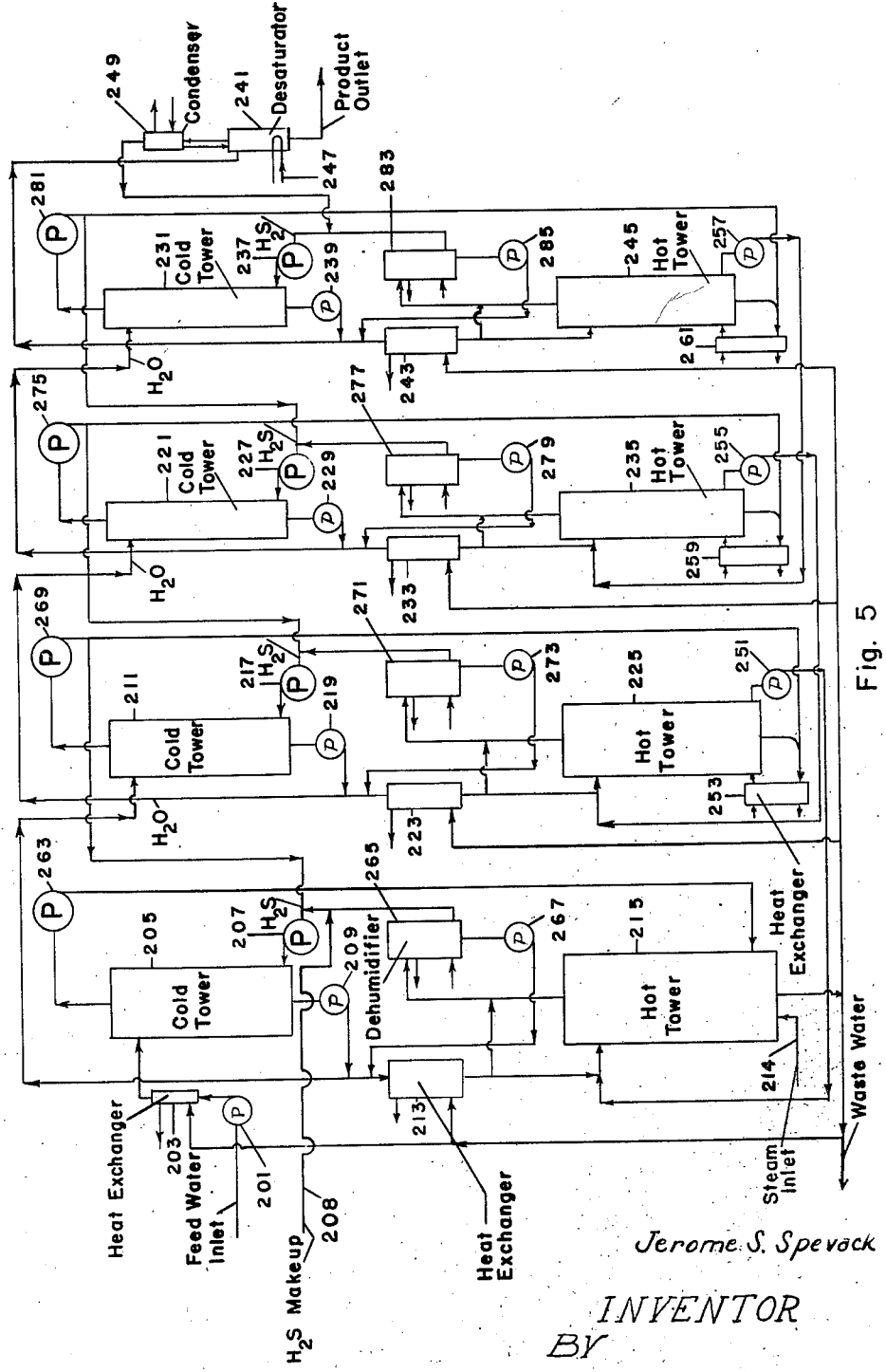

United States Patent Office 2,787,526
Patented Apr. 2, 1957

2,787,526
METHOD OF ISOTOPE CONCENTRATION

Jerome S. Spevack, New York, N. Y., assignor to United States of America as represented by the United States Atomic Energy Commission Application November 9, 1943, Serial No. 509,581

23 Claims. (Cl. 23—204)

This invention relates to an isotope concentration process, and more particularly it relates to a new and improved process for increasing the concentration of at least one of a plurality of isotopes of an element in a substance in which said plurality of isotopes may be present.

It is now well established that some chemical elements exist in two or more atomic forms called isotopes. These different isotopes have the same atomic number but different atomic weights.

Certain desired isotopes are found in but slight concentrations in some substances containing these elements. It has been urgently desired to have an efficient and economical process whereby a desired isotope can be concentrated in a substance which contains or is capable of containing the same. For example, water contains at least two isotopes of hydrogen, namely, hydrogen having the approximate atomic weight of one, and hydrogen (called deuterium) having the approximate atomic weight of two. The latter is normally present in water and other substances in only a very low concentration and it is very desirable to increase the concentration of the deuterium normally present in water or other substance containing or capable of containing the hydrogen isotopes.

It is an object of this invention to efficiently and economically increase the concentration of a desired isotope in a substance in which said isotope may exist, or be capable of existing, in admixture with one or more isotopes of the same element, and with or without the presence of other elements and their isotopes.

It is another object of this invention to provide a new and improved process for increasing the concentration of a desired isotope in a substance in which other isotopes of the same element may exist.

It is a more specific object of this invention to provide a new and improved process for increasing the concentration of a desired isotope of an element in a substance by exchanging the said desired isotope with another isotope of the same element between two substances both of which contain or are capable of containing each of said isotopes.

One of the primary objects of the invention is to provide a process for increasing the concentration of a desired isotope of an element in a substance by exchanging the said desired isotope with another isotope of the same element between two substances both of which contain or are capable of containing each of said isotopes, said exchange to be carried out at two or more different temperatures under conditions of substantial equilibrium of exchange.

Other objects of the invention will appear hereinafter.

The above and other objects of the invention may be accomplished, in general, by exchanging, at two or more different temperature stages, two isotopes of an element between substances that are physically separable from each other and each of which is capable of containing either of said isotopes, and withdrawing from a point between at least two of said temperature stages one of said substances containing an increased concentration of the desired isotope.

This invention in certain of its aspects is based on the fact that the equilibrium of exchange of said isotopes between two substances will be different at different temperatures, i. e., at different temperatures there will be a different equilibrium constant of exchange of isotopes between said two substances. For example, if water containing $H_2O$ and $HDO$ (D being the symbol for deuterium, a hydrogen isotope) is contacted with hydrogen sulfide containing $H_2S$ and $HDS$ at a given temperature there will be a definite equilibrium relationship in the exchange of the H and D atoms between the two substances, $H_2O$ and $H_2S$. The relationship between the deuterium-containing molecules of water and the deuterium-containing molecules of hydrogen sulfide may be expressed by the reaction:

$$H_2O + HDS \rightleftharpoons HDO + H_2S$$

and the equilibrium of exchange may be expressed by:

$$K = \frac{(HDO)(H_2S)}{(H_2O)(HDS)}$$

The value of the equilibrium constant K is different at different temperatures. In the above described system using liquid water and hydrogen sulfide gas, the constant K varies with the temperature substantially as follows:

| Temperature (° C.): | K |
|---|---|
| 0 | 2.55 |
| 25 | 2.35 |
| 50 | 2.17 |
| 100 | 1.95 |
| 150 | 1.80 |
| 200 | 1.54 |

From these data it can be stated that for a mixture of $H_2O$ and $H_2S$ containing a given quantity of deuterium, the concentration of deuterium in the water is greater at a relatively low temperature than at a relatively high temperature, and conversely the concentration of deuterium in the $H_2S$ is greater at a relatively high temperature than at a relatively low temperature. Advantage is taken of this tendency for the equilibrium to shift with temperature to increase progressively the deuterium content of water; or, in accordance with the broader aspects of the invention, to increase progressively the concentration of any desired isotope in any substance containing or capable of containing the desired as well as one or more additional isotopes of the same element, inasmuch as generally similar considerations apply to other pairs of substances between which isotope exchange reactions occur, as will more fully appear hereinafter.

The scope of the invention will be more readily apparent by reference to the following detailed description when taken in connection with the accompanying illustrations, in which:

Fig. 5 is a diagrammatic, side elevational view of a preferred embodiment of apparatus for use in accordance with this invention.

Figure 1:
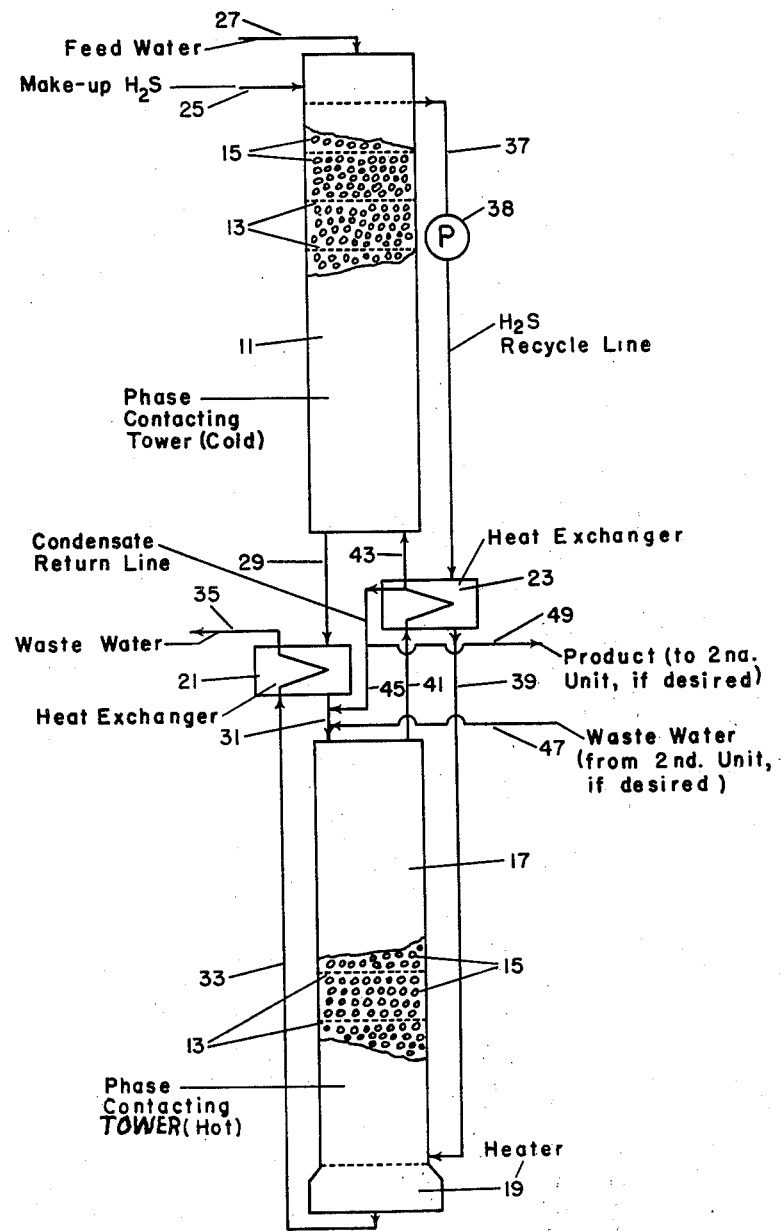
Fig. 1 is a diagrammatic, side elevational view, with parts cut away, showing one embodiment of apparatus suitable for use in carrying out the process of the invention, in accordance with which counter-current flow of reactants is employed.

In general, conventional elements such as valves, pumps, traps, etc., are not shown since their use and disposition will be obvious to those skilled in the art. Referring in detail to the apparatus shown in Fig. 1, reference numeral 11 generally designates a multi-plate counter-current processing tower of the type commonly used in processing two substances which are in distinct separable phases by passing the substances counter-currently to each other through the tower. As examples of such substances there may be mentioned at this point water and hydrogen sulfide, additional examples being given hereinafter. The tower may be constructed with a plurality of spaced foraminous plates 13 having a packing 15 positioned therebetween as illustrated, or it may be constructed as a conventional bubble-plate tower or the like, or in any other manner suitable for bringing about intimate contact between the substances employed in the process. Reference numeral 17 designates a second multi-plate counter-current processing tower which also may be constructed in any desired manner to contact two separable substances in a counter-current manner. Tower 17 may be similar in construction to tower 11, or otherwise.

Tower 17 is operated at a different temperature than tower 11. As illustrated, tower 17 is preferably operated at a higher temperature than tower 11. A boiler or other desired heating device 19 is positioned in the bottom of the tower 17 to maintain the temperature in tower 17 at the desired level. Heat exchangers 21 and 23 are positioned between towers 11 and 17 to afford heat exchange between the substances passing between the cold and hot towers. Conduit lines 25 and 27 are provided for passing or feeding the substances to be contacted (under suitable pressures) into the two-tower system.

The heavier of the two substances (for example, water in liquid phase) passes downwardly through tower 11; then from tower 11 through conduit 29 into heat exchanger 21, from heat exchanger 21 through conduit 31 into tower 17, from tower 17 through conduit 33 into heat exchanger 21, and from the latter through exit conduit 35. The lighter of the two substances (for example, hydrogen sulfide gas) passes from the upper part of tower 11 through conduit 37 into heat exchanger 23, then from heat exchanger 23 through conduit 39 into the lower part of tower 17, upwardly through tower 17, through conduit 41 into heat exchanger 23, from heat exchanger 23 through conduit 43 into the bottom of tower 11, upwardly through tower 11 and then out through conduit 37 by means of which it may be recycled between the contact towers. A suitable pump 38 may be provided in conduit 37 for causing circulation of the gas, or lighter phase substance.

Condensable vapors of the heavier substance (such as water) that may be present in the heated lighter substance (such as hydrogen sulfide) passing through heat exchanger 23 may be condensed to liquid phase and separated in heat exchanger 23, and thence passed through conduit 45 into conduit 31 for recycling downwardly through tower 17.

The condensate passing through conduit 45 may contain a sufficiently high concentration of the particular isotope sought, in which case it may be removed as the desired product through conduit 49, as illustrated. On the other hand, the substance containing the greatest concentration of the desired isotope may be found in one of the other conduits of the system between the two temperature stages. In the latter case, the substance having the high concentration of the desired isotope may be withdrawn from the desired point between the two temperature stages. Since the increase in concentration of the desired isotope always occurs as a result of the difference between the equilibrium constants of exchange at the two different temperatures employed in the two towers, the high concentration of the desired isotope will always be in the two substances passing between the two towers.

The actual concentrations of any of the streams in the system between the two temperature stages are the overall resultant of such factors as the concentrations of the heavier substance in the vapor phase (humidity), the concentration of the lighter substance in the liquid phase (solubility), and particularly the design and arrangement of the various units and accessories required for processing and transporting the streams entering and leaving the two towers.

The apparatus shown in Fig. 1 comprises one unit of an isotope concentration and separation apparatus. The concentration of the desired isotope in one substance and the separation from this substance from the other may be carried out in a plurality of like units. The heavier substance leaving the apparatus of Fig. 1 through conduit 35 may be passed to a next preceding unit, similar to the unit shown in Fig. 1, in which the concentration of desired isotope in the heavier substance is lower than that of the heavier substance in the unit shown in Fig. 1. The product, enriched in the desired isotope, leaving the unit shown in Fig. 1 through conduit 49 may be passed as feed stock to a next succeeding unit for further concentration therein of the desired isotope.

As illustrated, the lighter of the two contacting substances is continuously recycled, whereas the heavier is continuously fed into and withdrawn from the system. On the other hand, and if desired, the method just described may be modified by providing for recirculation of the heavier substance and the feeding and withdrawal of the lighter substance. Such a modification may be particularly desirable in cases where the lighter substance is the cheaper and/or more abundant of the pair of substances employed for the particular isotope exchange reaction under consideration.

The process of concentrating deuterium in water, by employing water and hydrogen sulfide as the contacting substances may be carried out in the apparatus of Fig. 1 in the following manner:

Water having a desired low temperature, for example, 20° C., is fed under 110 lbs. per sq. in. pressure into tower 11 through conduit 27. The entire system will therefore be operated at substantially 110 lbs. per sq. in. pressure. Make-up hydrogen sulfide, to compensate for losses, is fed into tower 11 through conduit 25. The water is passed through tower 11, conduit 29, heat exchanger 21, conduit 31, tower 17, conduit 33, heat exchanger 21, and then to waste or to a preceding unit through conduit 35. The hydrogen sulfide is, in turn, passed through conduit 37, heat exchanger 23, conduit 39, tower 17, conduit 41, heat exchanger 23, conduit 43, tower 11 and again through conduit 37. The water and hydrogen sulfide are heated to a desired temperature, for example, 110° C. by heater 19. The water vapor in the hot hydrogen sulfide gas is condensed therefrom by heat exchanger 23 and a portion is passed back to the water passing into tower 17 while another portion thereof is passed from the apparatus as the desired product containing a high concentration of deuterium as HDO or $D_2O$.

The relative quantities of water and hydrogen sulfide present in the system should preferably be in the ratio of about 1 molecular weight of feed water to 2 molecular weights of hydrogen sulfide circulated.

The water has the property of taking deuterium in exchange for hydrogen from the hydrogen sulfide at the lower temperature in tower 11, and the hydrogen sulfide has the property of taking deuterium in exchange for hydrogen from the water at the elevated temperature in tower 17 (see table above). As a consequence the hydrogen sulfide functions to strip the deuterium from the water in tower 17 and deliver it to the water in tower 11.

It usually happens in this particular system that the highest concentration of deuterium is in the cooled condensate passing from the heat exchanger 23. A portion of this condensate is therefor removed from the system as the product. There may be circumstances, however, under which the highest concentration of deuterium in the water is greatest in conduit 29. Under such circumstances the product will be withdrawn from this point in the system.

Figure 2:
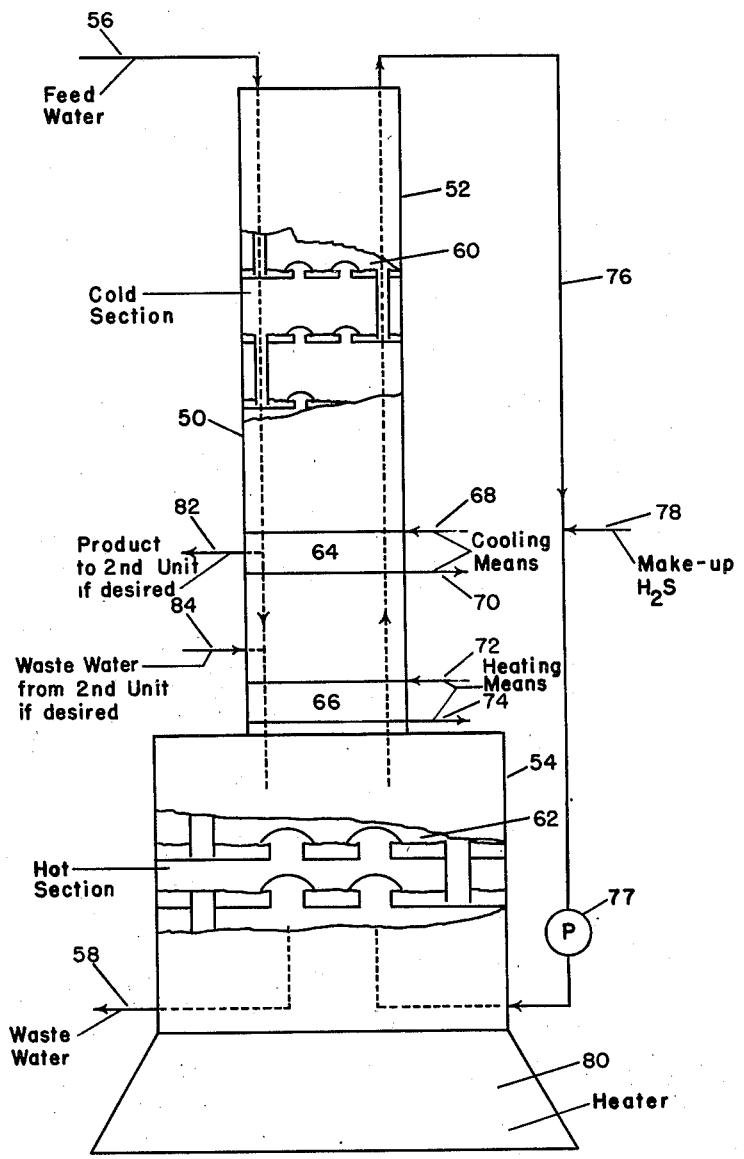
Fig. 2 is a similar diagrammatic, side elevational view of a modified form of apparatus that may be used in accordance with the invention, counter-current flow likewise being employed.

The apparatus shown in Fig. 2 of the drawings illustrates a unit which differs from that shown in Fig. 1 in that it comprises a single multi-plate counter-current tower with means for operating one end of the tower at a different temperature than the other end.

Referring to Fig. 2, the single tower 50 comprises two sections 52 and 54 which preferably have a materially different volumetric capacity. The lower section 54 is of substantially larger capacity than the upper section 52 in order to accommodate vapors due to vaporization of a substance which is in the liquid form in section 52. The tower in this modification of apparatus is illustrated as being constructed in the form of a conventional bubble-cap tower (see cut-away sections 60 and 62), although it may have any desired construction in which two substances in distinct, separable phases may be passed counter-currently to each other. This apparatus, as in the apparatus of Fig. 1, is designed to feed and remove the heavier substance, whereas the lighter substance is continuously recycled.

The substance from which the ultimate product is to be obtained, for example, water, is fed to the tower through conduit 56. The substance entering the top of the tower through conduit 56 is passed downwardly through the tower and is withdrawn through conduit 58 adjacent the bottom of the tower.

In the lower part of section 52 means 64 are provided for cooling the materials to the relatively low temperature at which it is desired to maintain section 52, and near the top of section 54 means 66 are provided for heating the materials to the relatively elevated temperature at which it is desired to maintain section 54. The cooling and heating means may comprise cooling and heating coils having inlet and outlet conduits 68 and 70, and 72 and 74 respectively.

For convenience of construction or otherwise, heating means 66 may actually be disposed in or near the base of section 52 as illustrated, although nearer section 54 than is cooling means 64. In other words, the actual boundary between the cold and hot zones of tower 50 need not necessarily be coincident with the physical boundary between sections 52 and 54.

The lighter of the two substances, for example, hydrogen sulfide, will pass from the top of the tower, then through conduit 76 to the bottom of the tower, and then upwardly through the tower. A suitable pump 77 may be provided in line 76. The lighter substance may be replenished through conduit 78.

Section 54 of the tower may be maintained at the desired temperature by means of heater 80. The product, in this instance water enriched in heavy water, may be withdrawn from the tower through conduit 82, and the waste from a subsequent stage may be passed into the tower through conduit 84.

The apparatus of Fig. 2 operates in substantially the same manner as that already described in connection with Fig. 1 and it is therefore believed unnecessary to again explain the operation in detail.

When using a multi-stage, counter-current flow, processing tower of the general type illustrated above, it is possible to secure any desired concentration of a desired isotope in either of the substances which are contacted with each other. It is only necessary to feed a relatively large quantity of the substance containing the desired isotope into the system, and draw off a relatively small quantity of substance containing the said isotope in the desired concentration.

Figure 3:
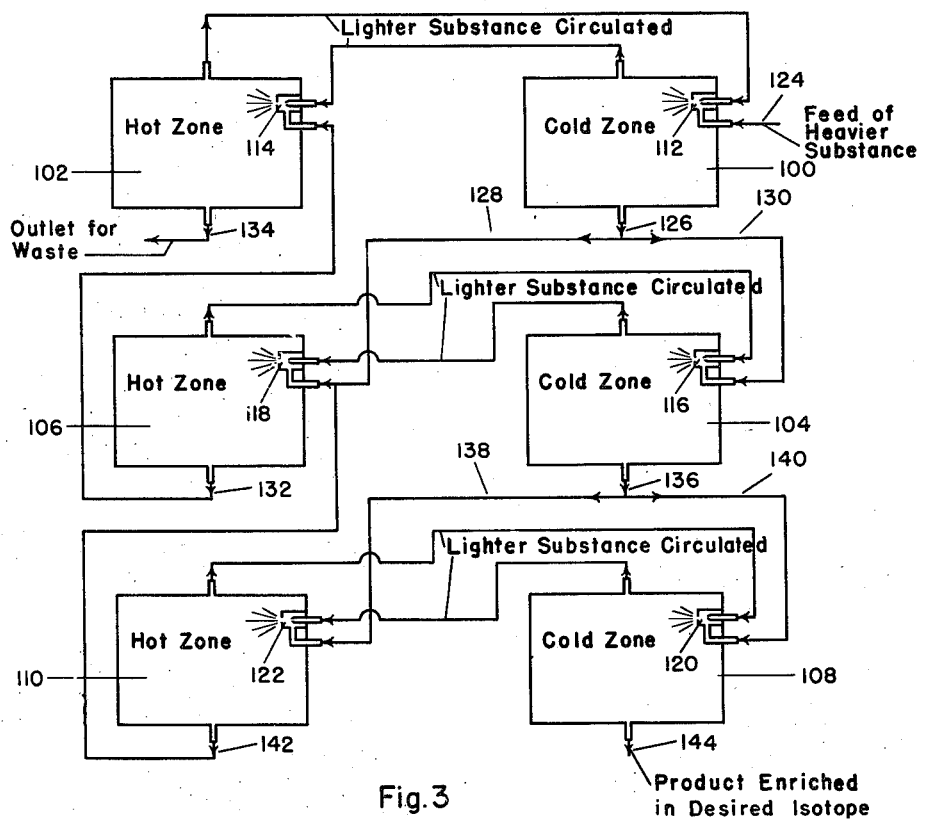
Fig. 3 is a diagrammatic, side elevational view of another embodiment of apparatus in which a counter-current flow of substances is not employed.

Although it may be generally preferred, it is not however, necessary to employ a multi-plate counter-current processing tower. Fig. 3 of the drawings illustrates diagrammatically a form of apparatus in which the use of a counter-current, multi-stage tower is dispensed with.

Referring to Fig. 3, reference numerals 100, 102, 104, 106, 108 and 110 designate isotope exchange equilibrium chambers into which are introduced the two substances between which there is to be an exchange of isotopes. In order to finely divide the two substances and bring them into intimate admixture so as quickly to obtain an equilibrium of exchange of isotopes, it is desirable to introduce the two substances into said chambers by means of the spray injectors 112, 114, 116, 118, 120 and 122 respectively. Chambers 100, 104 and 108 are maintained at a relatively cold temperature, for example, 25° C., and chambers 102, 106 and 110 are maintained at a relatively hot temperature, for example, 200° C.

In each chamber the lighter of the two separable substances flows from the top of the chamber and the heavier substance flows from the bottom of the chamber.

The heavier of the two substances, in which it is desired to concentrate the desirable isotope, is passed into spray injector 112 in chamber 100 through conduit 124. It passes from the chamber 100 through conduit 126. From conduit 126 it is split into two fractions, one of which passes through conduit 128 into spray injector 118, and the other passes through conduit 130 into spray injector 116. The fraction which passes into spray injector 118 passes through chamber 106, out through conduit 132, then into spray injector 114, then through chamber 102 and to waste through conduit 134. The fraction which passes into spray injector 116 passes through chamber 104, then out through conduit 136. From conduit 136 the substance is again split into two fractions, one of which passes through conduit 138 into spray injector 122 and the other passes through conduit 140 into spray injector 120. The fraction which passes into spray injector 122 passes through chamber 110, then out through conduit 142 and into spray injector 118. The fraction which passes into spray injector 120 passes through chamber 108 and then is withdrawn as the product through conduit 144.

The lighter of the two substances in chambers 100 and 102 is continuously cycled from one to the other of said chambers as follows; through spray injector 112 into chamber 100, from chamber 100 through spray injector 114 into chamber 102 and from chamber 102 again into spray injector 112. A similar continuous cycling of the lighter of the two substances is carried out between chambers 104 and 106 and also between chambers 108 and 110. Lighter substance for make-up purposes may be introduced into each of these circuits as desired, by conventional means not shown.

Since chamber 100 is a cold chamber the heavier substance strips the desired isotope from the lighter substance and the isotope-enriched product passes part to chamber 104 and part to chamber 106 (this portion of the discussion is based upon the use of water as the "heavier" substance and hydrogen sulfide as the "lighter" substance), and the desired isotope concentrates in the heavier substance. In chamber 104, the heavier substance is again contacted, at a relatively low temperature, with a quantity of the lighter substance which, however, has a higher concentration of the desired isotope and thereby still further increases the concentration of said isotope in the heavier substance. In chamber 108, the heavier substance is still further enriched in the desired isotope by contacting the same with a quantity of the lighter substance having a still higher concentration of said isotope.

In chambers 102, 106, and 110, operating at relatively high temperatures, the lighter substance is progressively enriched in the desired isotope seriatim in the same manner as is the heavier substance in chambers 100, 104 and 108.

The fraction of enriched heavy substance passing from chamber 100 into chamber 106, and from chamber 104 into chamber 110 functions to enrich progressively the lighter substance as the latter passes through chambers 106 and 110. The heavy substance passing from chamber 110 and from which a part of the desired isotope has been stripped is passed to chamber 106 and then to chamber 102 for further progressive stripping, and is finally discharged to waste after passing from chamber 102 via conduit 134.

I regard it as within the scope of my invention to continue the progressive increase in concentration of a desired isotope in the desired substance through as many stages as desired.

Figure 4:
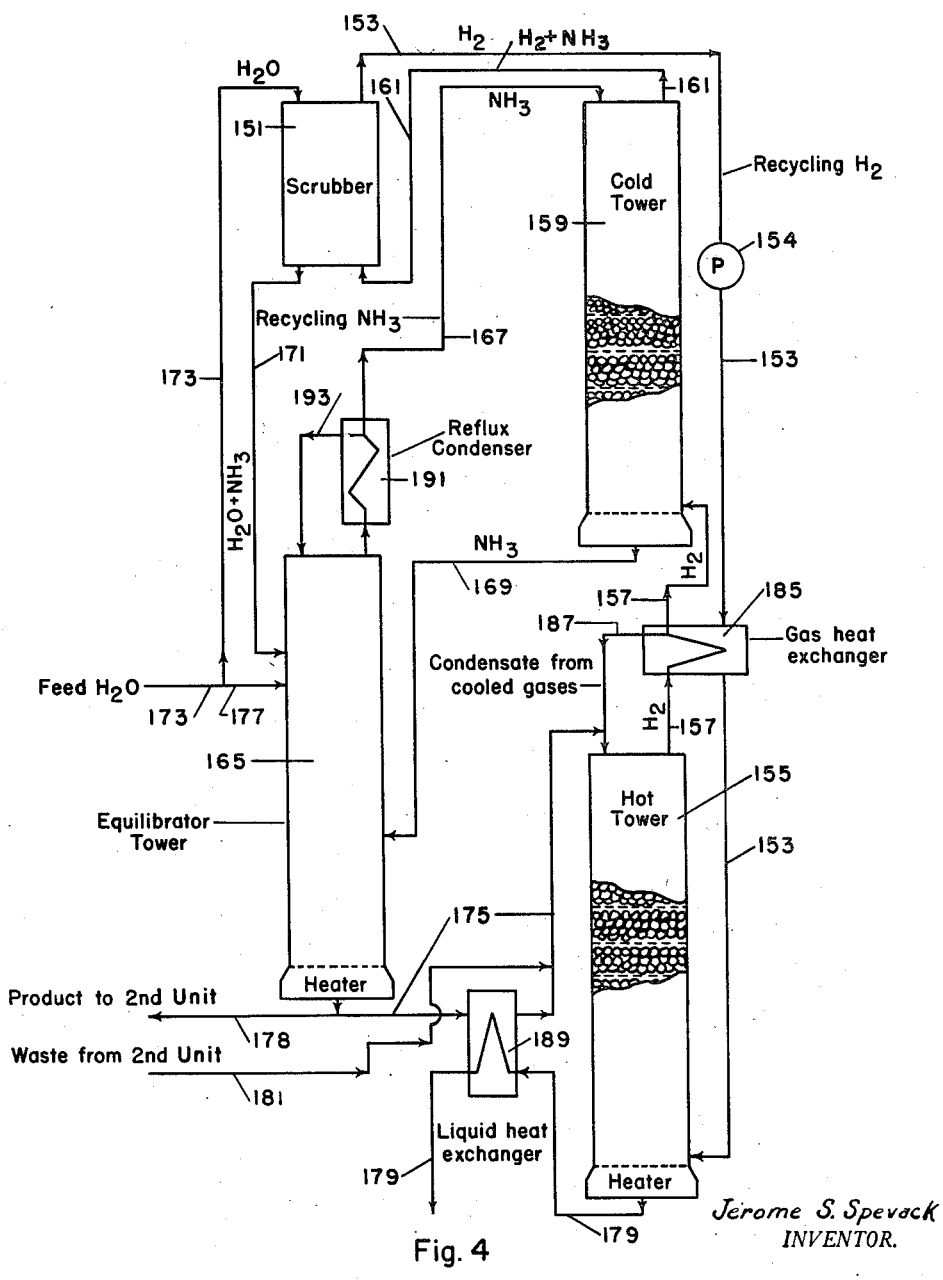
Fig. 4 is a diagrammatic, side elevational view of still another embodiment of apparatus which may be operated in connection with the use of three separable substances for increasing the concentration of a desired isotope in one of said substances.

To illustrate that the present invention is not limited to a two component system, reference may be had to the apparatus shown in Fig. 4. This apparatus functions with three substances or components, for the concentration of a desired isotope in one of them. Each of the three substances must contain, or be capable of containing, the desired isotope in question as well as at least one other isotope thereof. The apparatus shown in Fig. 4, for reasons of simplicity, is illustrated with suitable indicia and will be described with specific reference to the three substances water, ammonia, and hydrogen; all of which may contain the element H as hydrogen and/or deuterium. It is to be understood, however, that the method about to be described is not limited to the specific substances referred to, nor to the particular apparatus shown.

Referring to Fig. 4, hydrogen is circulated from scrubber 151 via line 153 and pump 154 to hot tower 155, then through line 157 to cold tower 159 from which it is returned via line 161 to the scrubber 151. Scrubber 151 is used in this particular embodiment for the reason that ammonia can thereby be readily removed from its admixture with hydrogen.

Ammonia is circulated from equilibrator tower 165 to the cold tower 159 via line 167 and back to the equilibrator tower via line 169. The small amount of ammonia scrubbed from the hydrogen by water in scrubber 151 is returned to equilibrator tower 165 via line 171.

Feed water is introduced via inlet 173 to the scrubber 151 from which it flows to the equilibrator tower 165 via line 171, and from the latter to the hot tower 155 via line 175. By-pass line 177 between feed water inlet 173 and equilibrator tower 165 permits the introduction of a portion of the feed water directly into the equilibrator tower, when and as desired.

In passing from the equilibrator tower 165 to the hot tower 155 a portion of the circulating water may be drawn off via line 178 as the product, the remainder of the water passing to the hot tower. Preferably, the quantities of $NH_3$ and $H_2O$ flowing in this system are in the ratio of approximately 1 mol of $NH_3$ recycled per mol of feed $H_2O$, and the quantities of $H_2$ to $H_2O$ flowing are in the ratio of approximately 2 mols of $H_2$ recycled per mold of feed water.

The hydrogen strips deuterium from the water by exchange in the hot tower. In the cold tower the ammonia strips deuterium from the hydrogen, by exchange. In the equilibrator tower the feed water strips deuterium from the ammonia by exchange. A portion of the feed water having been enriched in heavy water as indicated, may be withdrawn as product from the base of equilibrator tower 165 via line 178. All or any portion of the product so withdrawn may be employed as feed stock to a second unit for further concentration, if desired. The stripped water, relatively low in deuterium, passing from the hot tower 155 may be passed to waste via line 179, or to a preceding unit that may be similar in construction for still further stripping as desired. Furthermore, the waste from a subsequent unit may be introduced through line 181 into hot tower 155 for further stripping as desired.

Fig. 4 also shows several other apparatus elements that may be advantageously employed in a practical embodiment of this type of operation, but which require no extended comment from a theoretical viewpoint. Thus, a heat exchanger 185 is provided for preheating the hydrogen recycled to hot tower 155 through line 153, and for cooling the hydrogen leaving said hot tower through line 157. Condensate obtained upon cooling the hydrogen is returned to hot tower 155 via line 187. Waste water leaving the base of hot tower 155 via line 179 is passed through heat exchanger 189 to exchange heat with incoming enriched product flowing from equilibrator tower 165 to hot tower 155 in line 175. A reflux condenser 191 is provided through which pass vapors from the equilibrator tower 165, with condensate returned to the tower through line 193. If desired, a partial condenser (not shown) may be placed in exit line 161 from the cold tower 159, in order to assist in removing ammonia from the hydrogen-ammonia gas mixture leaving the cold tower.

From a consideration of the exchange reactions which take place in each of the towers 155, 159 and 165, including the manner in which the respective equilibrium constants vary with changes in temperature, I have found that feed water of a given deuterium concentration (normal or otherwise) can be reduced to "waste" water of a given lower concentration—which is therefore a measure of the enrichment in deuterium in the product—depending upon the relation between the three tower temperatures. More particularly, for maximum recovery (i. e., for a minimum concentration of deuterium in the waste water) I prefer that the temperatures in the hot tower 155 and the equilibrator tower 165 be relatively high, while the temperature in the cold tower be relatively low. However, since due regard must be had to the rates of reaction, as distinguished from the equilibrium constants, I nevertheless prefer that the minimum temperature of operation of the cold tower be approximately 50° C. Cold tower operating temperatures varying from somewhat below to considerably above this value may be employed, however, care being taken in any given case to maintain a substantial differential between the particular cold tower temperature employed and the corresponding hot tower temperature.

The use of a substantially elevated pressure throughout the system is preferable; for example, a pressure of the order of about 40 atmospheres may be advantageously employed, as well as pressures considerably above and below this value.

The equilibrator tower 165 may be operated at a temperature in the range of approximately 130° to 215° C., and preferably about 175° C.; while the hot tower 155 may be operated at a somewhat higher temperature in the range of approximately 190 to 225° C., and preferably about 215° C.

It will be understood that the pressure and temperature conditions in the cold tower 159 are such that at least a substantial portion of the ammonia is present in liquid phase, and as such passes downwardly through the tower countercurrently to the ascending stream of deuterium-containing hydrogen gas.

Figure 5 of the drawings illustrates a preferred construction of apparatus, comprising a plurality of units of two stages each, for the progressive concentration of a desired isotope in one of two physically separable substances.

By the term "physically separable substances" here and elsewhere in the specification is meant substances which are actually in separate phases at the time of the exchange reaction (e. g., liquid water and hydrogen sulfide gas) or substances which may be readily resolved into separate phases after the desired exchange reaction has taken place (e. g., water vapor or steam and hydrogen gas).

This apparatus will be described with specific reference to the concentration of deuterium in water, in a system employing water and hydrogen sulfide as the physically separable substances between which an exchange of deuterium and hydrogen takes place. For purposes of complete clarification of the invention, the specific quantities of substances passed through the various parts of the apparatus will be set forth, it being understood that where exceedingly large amounts of substances are specified as passing through a single unit (or through any stage of a single unit) it may be desirable to employ a number of like units or stages connected in parallel.

The specific example hereinafter described is operated at a pressure of approximately 66.2 lbs. per sq. in., absolute (51.5 lbs. per sq. in. gauge). The processing towers in the system are all of the counter-current type. The cold towers in the system are operated at a temperature of approximately 15° C. and the hot towers at a temperature of approximately 80° C. When so operated with the quantities of substances substantially as given below, a four-stage apparatus such as is illustrated is capable of producing about 5 tons per month of deuterium oxide ($D_2O$) in the form of water containing 2% of deuterium oxide ($D_2O$).

Natural water, for example, from a clear, cold stream, is pumped at a rate of 1350 gallons per minute (G. P. M.), by means of pump 201, through the feed water heat exchange device 203, and then into the top of cold tower 205. At the same time 532,600 cubic feet per minute (C. F. M.) of hydrogen sulfide gas is passed into the bottom of tower 205 by means of a blower 207. A conduit 208 leads from a suitable source of $H_2S$ to permit such replenishment of the system as may be necessary.

The deuterium-enriched water is passed from the bottom of tower 205 by means of pump 209. 400 G. P. M. of this water are passed into cold tower 211 and the remainder is passed through heater 213 and then into hot tower 215.

The water in cold tower 211 passes counter-currently to a stream of hydrogen sulfide (156,800 C. F. M.) being passed into tower 211 by means of blower 217. The water, further enriched with deuterium, is passed from the bottom of tower 211 by means of pump 219. 118 G. P. M. of this water are passed into cold tower 221 and the remainder is passed through heater 223 and then into hot tower 225.

The water in cold tower 221 passes counter-currently to a stream of hydrogen sulfide (46,000 C. F. M.) being passed into tower 221 by means of blower 227. The water, which has been still further enriched with deuterium, is passed from the bottom of tower 221 by means of pump 229. 34 G. P. M. of this water are passed into cold tower 231, and the remainder is passed through heater 233 and then into hot tower 235.

The water in cold tower 231 passes counter-currently to a stream of hydrogen sulfide (13,500 C. F. M.) being passed into tower 231 by means of blower 237. The water which by this pass has again been enriched with deuterium, is passed from the bottom of tower 231 by means of pump 239. 1.33 G. P. M. of this water are passed into the product desaturator 241, and the remainder is passed through heater 243 and then into hot tower 245.

The water in the desaturator 241 is heated by means of steam coil 247 so as to drive off any dissolved hydrogen sulfide. Vaporized water passing from desaturator 241 is condensed in condenser 249 and is returned to the desaturator from which the water is withdrawn at a rate of 1.32 G. P. M. as the deuterium-enriched product.

The water passing from hot tower 215 is passed to waste. However, the heat from this water may be utilized in heating the feed water heat-exchanger 203 (when the feed water is at a temperature below that desired in cold tower 205), and water heaters 213, 223, 233 and 243. The major portion of water passing from hot tower 225 is passed, by means of pump 251, to the top of hot tower 215 for further stripping of D by the hydrogen sulfide passing therethrough. A minor portion of the water from tower 225 is vaporized in boiler 253 and is carried upwardly through tower 225 by the hydrogen sulfide passed through this tower. Similarly, the major quantities of water passing from hot towers 235 and 245 are passed, respectively, by means of pumps 255 and 257, into the respective preceding hot towers 225 and 235; the minor quantities of water being vaporized, respectively in boilers 259 and 261, and carried back into the respective towers by the hydrogen sulfide passing thereinto.

The hydrogen sulfide passing from cold tower 205 is passed, by means of blower 263, into hot tower 215, preferably at a point spaced from the bottom thereof, then out through the top of this tower, then through dehumidifier 265 (which may take the form of a conventional surface condenser, or otherwise) then through blower 207 and again through cold tower 205. The hydrogen sulfide passing from cold tower 205 into hot tower 215 is heated by introducing steam through conduit 214 into the bottom of tower 215. As a result of introducing the hydrogen sulfide at a point spaced from the bottom of tower 215, the steam from conduit 214 will strip hydrogen sulfide from the water which passes to waste. Water removed from the gas in dehumidifier 265 is passed by means of pump 267 through water heater 213 and into hot tower 215.

The hydrogen sulfide passing from cold tower 211 is passed, by means of blower 269, into the bottom of hot tower 225, then out through the top of this tower, then through dehumidifier 271, then through blower 217 and again through cold tower 211. The hydrogen sulfide is preferably introduced into hot tower 225 via heater or boiler 253, which serves to increase its temperature to the temperature of hot tower operation. Water removed from the gas in dehumidifier 271 is passed, by means of pump 273, through water heater 223 and into hot tower 225. To make up for losses in the hydrogen sulfide circulated between towers 205 and 215, a quantity of the hydrogen sulfide passing from tower 211 through blower 269 is passed to the inlet of blower 207.

The hydrogen sulfide passing from cold tower 221 is passed, by means of blower 275, into the bottom of hot tower 235 (preferably through boiler 259), then out through the top of this tower, then through dehumidifier 277, then through blower 227 and again through cold tower 221. Water removed from the gas in dehumidifier 277 is passed, by means of pump 279, through water heater 233 and into hot tower 235. To make up for losses in hydrogen sulfide circulated between towers 211 and 225, a quantity of the hydrogen sulfide passing from tower 221 through blower 275 is passed in the inlet of blower 217.

The hydrogen sulfide passing from cold tower 231 is passed, by means of blower 281, into the bottom of hot tower 245 (preferably through boiler 261), then out through the top of this tower, then through dehumidifier 283, then through blower 237 and again through cold tower 231. Water removed from the gas in dehumidifier 283 is passed, by means of pump 285, through water heater 243 and into hot tower 245. To make up for losses in hydrogen sulfide circulated between towers 221 and 235, a quantity of hydrogen sulfide passing from tower 231 through blower 281 is passed to the inlet of blower 227.

Hydrogen sulfide passing from desaturator 241 and condenser 249 is passed to the inlet of blower 237. Additional quantities of make-up hydrogen sulfide can be introduced into the system such as at the inlet to blower 237 or elsewhere, as desired.

If desired, a portion of the water flowing from one or more of the heaters 213, 223, 233 and 243 may be introduced into the gas stream or streams issuing from the corresponding hot tower or towers, to assist in removing entrained particles of moisture therefrom.

In the above described process, the water which passes from the first hot tower is passed to waste. However, this water can be further processed for further removal of deuterium, either by passing same through other similar units or otherwise. The first pass of water through the hot tower will usually remove about 13% of the deuterium present in the water. Under some circumstances, it may be desirable to remove further quantities of the deuterium from the water before passing it to waste. This may be particularly true when operating with substances other than water as the source of the desired isotope.

In the above described process for the concentration of an isotope in a substance, the quantities of the substances used for the exchange reaction i. e., exchange between isotopes, is dependent upon a number of factors such as the size of the apparatus, the period of time necessary for a substantial degree of equilibrium to take place, the concentration of the desired isotope in one or both of the substances, and the degree to which it is desired to increase the concentration in a given unit. The actual quantities of the substances fed to the apparatus, and/or cycled through the apparatus, may therefore be varied between wide limits.

The criteria which determine the effective limits of the rates of flow of the lighter substance to the heavier substance are in some respects similar to those which determine the proper reflux ratio to be used in a conventional fractionating tower. If on the one hand the flow ratio of the lighter substance to the heavier substance is made too high, the concentration of the desired isotope in the lighter substance entering the cold tower will be below that value at which it is in equilibrium with the heavier substance leaving the cold tower and hence the system will operate at something less than optimum efficiency. If on the other hand the flow ratio is made too small, the concentration of the desired isotope in the lighter substance in the hot tower will closely approach an equilibrium value before the lighter material reaches the top of the tower and hence the system will operate at something less than optimum efficiency. Thus in cases where the desired isotope tends to concentrate in the heavier substance it is usually desirable to maintain the flow ratio between the indicated limits. For the water-hydrogen sulfide system previously described the preferred limits are approximately 1.5 mols of hydrogen sulfide per mol of water and 3.0 mols of hydrogen sulfide per mol of water.

It will be apparent to those skilled in the art that in other cases such as when the desired isotope tends to concentrate in the lighter substance and also when three or more components are used, the choice of proper flow ratios and the effective limits of such ratios will be controlled by considerations similar to those described above.

In determining the relative quantities of the components to be contacted with each other, it is desirable to take into account the amounts of the substances unavoidably present in each phase by reason of factors such as pressure, temperature, mutual solubility (where at least one of the substances is non-gaseous) and other conditions in the reaction environment. Ordinarily the optimum flow ratio of the components falls between the approximate effective fractionation factors for the two operating temperatures, the fractionation factor being the distribution of total desired isotope between the two phases.

For the water-hydrogen sulfide system the approximate effective fractionation factor ($\beta$) may be expressed as follows for low concentrations of deuterium:

$$(\beta) = \frac{(1+x)(K+y)}{(1+y)(Kx+1)\alpha}$$

wherein:

$x$ = the humidity in the vapor phase expressed in mols of water per mol of hydrogen sulfide $y$ = the solubility of $H_2S$ in the liquid phase expressed in mols of $H_2S$ per mole of water.

$K$ = the equilibrium constant for the isotope exchange reaction, at a given operating temperature $\alpha$ = The relative volatility of the pure deuterium containing compound with respect to the corresponding substance having no deuterium molecularly combined (e. g., for $H_2S$ and water, $\alpha = {}^{P}HDO/{}^{P}H_2O$, which is assumed to be equal to ${}^{P}HDS/{}^{P}H_2S$)

In accordance with my invention, the substance in which the desired isotope concentrates in greater amount, i. e., the substance in which the concentration is favored by the equilibrium constant K, should be fed into the tower operating at that temperature at which the equilibrium constant will be greatest. For example, in the above-described exchange of deuterium between $H_2O$ and $H_2S$, the deuterium concentrates in greater amount in the $H_2O$ and the equilibrium constant is greatest in the tower operating at the colder temperature. Therefore, the $H_2O$ is fed itno the colder tower.

When water is employed as the source of deuterium which is to be concentrated in a quantity of the water that is withdrawn as product, it is necessary to feed a very large quantity of water in comparison to the quantity collected as the product. This is due to the very small deuterium content of normal, naturally occurring water (of the order of $1.4 \times 10^{-4}$ mol per mol of water). The quantity of hydrogen sulfide gas cycled through the two temperature stages is preferably large (ratio of about 2 mols of $H_2S$ to 1 mol $H_2O$), in order that an equilibrium of exchange can be established between the water and hydrogen sulfide at the two different temperatures.

The dimensions of the contact towers required to increase the concentration of an isotope in a particular substance can be obtained by methods employed in connection with conventional distillation and absorbition processes. These dimensions depend upon factors such as the rates of diffusion and flow of the substances contacted with each other, the rate of the exchange reactions, the type of tower construction and tower packing used, etc. Those skilled in the art can readily determine such dimensions from the general information given herein.

In a particular isotope exchange reaction, where it is necessary to employ exceedingly long towers with a great many plates, it is obvious that the same result can be effected by the use of a plurality of relatively short towers connected in series.

As above stated the two or more substances selected for the isotope exchange should have distinct phases which are separate from each other, or in the case of two or more fluids where only a single phase may be present during at least a portion of the reaction, they should be readily separable from each other. The substances selected may comprise a liquid and a gas, as described, or they may comprise two liquids, two gases, a solid and a liquid, or even a solid and a gas. In other words, of the various substances which may be employed in the practice of the present invention at least one should be present in the reaction zone in fluid form. It is only necessary that the substances used be capable of an isotope exchange of the nature described herein, that the substances be present in separate phases or at least be physically separable from each other, and that they be contacted at two materially different temperatures. It is relatively immaterial that one of the substances may be somewhat soluble (or dispersible) in the other as long as they are generally physically separable from each other.

The present invention can be used for increasing the concentration of a desired isotope of any element of which there exist two or more isotopes, and the invention may be carried out with a plurality of any substances capable of containing the said isotopes and which substances are in separate phases or at least are readily physically separable from each other.

Frequently the isotope exchange reaction takes place much more readily between the selected substances with the aid of a catalyst. For example, the exchange of H for D between NH₃ and H₂, or between H₂O and H₂ takes place much more readily by the use of one or more catalysts such as platinum, nickel, cobalt, iron, ruthenium, rhodium, palladium, osmium, iridium, chromium, molybdenum, tungsten and rhenium. The use of catalysts of the foregoing nature, or otherwise, for promoting the exchange reaction of isotopes between various substances is considered to be well within the scope of the present invention. The exchange reaction in the equilibrator tower 165 of Fig. 4 takes place in the liquid phase between water and dissolved ammonia, and is apparently a rapidly occurring ionic exchange reaction requiring no catalyst. However and when desired, the use of catalysts for promoting this exchange reaction may also be resorted to.

As examples of isotopes which may be concentrated in accordance with this invention by a method which includes isotopic exchange at different temperature stages as above described, the following may be named:

1. Deuterium may be concentrated in either of the following groups of substances by exchange between the same:

$H_2$ and $H_2O$
$H_2$ and $NH_3$
$H_2O$ and $H_2S$
$H_2O$ and $HCl$
$H_2O$ and $HBr$
$H_2O$ and $HI$
$H_2O$ and phosphine
$H_2O$ and an alkyl phosphine, such as the methyl and ethyl phosphines
$H_2O$ and any compound which contains an —SH group and which is physically separable from water, for example, methyl, ethyl or propyl mercaptan
$H_2O$ and thiophenol
$H_2SO_4$ and $HCl$
$H_2O$ and acetone ($CH_3COCH_3$)

2. Sulfur having an atomic weight of 34 may be concentrated in either of the following substances by exchange between them:
$SO_2$ and $NaHSO_3$ 3. Oxygen having an atomic weight of 18 may be concentrated in either of the following groups of substances by exchange between them:

$CO_2$ and $H_2O$
$SO_2$ and $H_2O$

4. Chlorine having an atomic weight of 37 may be concentrated in either of the following groups of substances by exchange between them:

$Cl_2$ and $HCl$
$Cl_2$ and chloroform
$NH_4Cl$ and $HCl$
$AlCl_3$ and $NaCl$

5. Carbon having an atomic weight of 13 may be concentrated in either of the following groups of substances by exchange between them:

$CO_2$ and $NaHCO_3$
$NaCN$ and $HCN$

6. Nitrogen having an atomic weight of 15 may be concentrated in either of the following groups of substances by exchange between them:

$NH_3$ and $NH_4NO_3$
$NH_3$ and $NaCN$
$NH_3$ and $NH_4OH$

Any of the above substances which are normally in solid form may be employed in the exchange reaction in the form of solutions in suitable solvents of which water is an example, if desired. In cases where a plurality of the substances between which an exchange of isotopes is to be effected are normally in solid form, they may conveniently be employed in the exchange reaction in the form of solutions in a plurality of suitable solvents which are relatively immiscible with each other. For example, in the case of the substances $AlCl_3$ and $NaCl$, mentioned above under item (4), these may be brought into contact in the form of solutions in solvents which are relatively non-miscible, such as carbon tetrachloride or ether for $AlCl_3$ and water for $NaCl$.

Although many other examples of isotopes and exchange substances might be given, it is believed the above species clearly indicate the wide scope and general applicability of the process of this invention.

Wherever in the foregoing description reference has been made to particular operating pressures, it is to be understood that this is merely by way of example, and that it is within the scope of the invention to vary these values over very wide ranges.

It will be understood that the terms "substance" and "material" are employed interchangeably in the specification and claims to designate given elements or compounds generically, whether or not associated with other elements or compounds, unless indicated otherwise by the context.

Since it is obvious that many other modifications and embodiments of the above-described details can be made without departing from the nature and spirit of the invention, it is to be understood that this invention is not to be limited to the above-described details except as set forth in the appended claims.

I claim:

1. The method of producing a substance containing concentrated therein an isotope of an element which comprises exchanging, at two different temperatures stages, said isotope with another isotope of the same element between chemically different substances which are physically separable from each other and which are capable of containing each of said isotopes, at least one of said substances being a fluid, maintaining said substances in separate phases between said two temperature stages, and withdrawing, from a point between said stages, a portion of one of said substances containing concentrated therein one of said isotopes.

2. The method of producing a substance containing concentrated therein an isotope of an element which compriess exchanging, at two different temperature stages, two isotopes of an element including said first-mentioned isotope between a liquid and a chemically different gas both of which are capable of containing each of said isotopes, separating the liquid and gas between said stages, and withdrawing, from a point between said stages, a portion of one of said separated substances containing concentrated therein said first-mentioned isotope.

3. The method of producing a substance containing concentrated therein an isotope of an element which comprises exchanging, at two different temperature stages, two isotopes of an element including said first-mentioned isotope between chemically different liquids which are physically separable from each other and which are capable of containing each of said isotopes, separating said liquids between said stages, and withdrawing from a point between said stages, one of said separated substances containing concentrated therein said first-mentioned isotope.

4. The method of producing a substance containing concentrated therein an isotope of an element which comprises exchanging, at two different temperature stages, two isotopes of an element including said first-mentioned isotope between a liquid and a chemically different gas both of which are capable of containing each of said isotopes, separating the liquid and gas between said stages, and withdrawing as product containing said first-mentioned isotope liquid passing from the colder to the hotter of said stages.

5. The method of producing a substance containing concentrated therein an isotope of an element which comprises contacting, concurrently with each other in a plurality of pairs of different temperature stages, two physically separable chemically different substances which are capable of containing said isotope and another isotope of the same element, at least one of said substances being a fluid, carrying out said concurrent contact at conditions under which an exchange of said isotopes takes place between said substances, circulating one of said substances between each of the pairs of different temperature stages, passing at least a portion of the other of said substances through the colder of succeeding pairs of said different temperature stages, and withdrawing from the colder of one of said pairs of different temperature stages at least a portion of said other substance containing concentrated therein said first-mentioned isotope.

6. The method of producing a substance containing deuterium concentrated therein which comprises exchanging, at two different temperature stages, deuterium and hydrogen between chemically different substances which are physically separable from each other and which are capable of containing both deuterium and hydrogen, at least one of said substances being a fluid, separating said substances from each other between said stages, and withdrawing, from a point between said stages, one of said substances containing deuterium concentrated therein.

7. The method of producing water containing deuterium concentrated therein which comprises exchanging, at two different temperature stages, deutermium and hydrogen between water and another chemically different substance which is physically separable from the water and which is capable of containing both deuterium and hydrogen, separating the water from said other substance, and withdrawing water passing from the colder temperature stage to the hotter temperature stage.

8. The method of producing water containing deuterium concentrated therein which comprises exchanging, at two different temperature stages, deuterium and hydrogen between water and hydrogen sulfide, and withdrawing water passing from the colder temperature stage to the hotter temperature stage.

9. The method of producing water containing deuterium concentrated therein which comprises exchanging, at two different temperature stages, deuterium and hydrogen between water and a compound containing a thiol group which compound is physically separable from water, separating the water from said other compound, and withdrawning water passing from the colder temperature stage to the hotter temperature stage.

10. The method of producing water containing deuterium concentrated therein which comprises exchanging, at two different temperature stages, deuterium and hydrogen between water and ethyl mercaptan, separating said water and said ethyl mercaptan between said stages, and withdrawing water passing from the colder temperature stage to the hotter temperature stage.

11. The method of producing water containing deuterium concentrated therein which comprises contacting, counter-currently to each other at two different temperature stages, water and another chemically different substance which is physically separable from water and which is capable of containing both deuterium and hydrogen, carrying out said contact at conditions under which an exchange of deuterium and hydrogen takes place between said water and said other substance, separating the water and said other substance between said stages, and withdrawing water passing from the colder temperature stage to the hotter temperature stage.

12. The method of producing water containing deuterium concentrated therein which comprises contacting, counter-currently to each other at two different temperature stages, water and hydrogen sulfide, separating the water and hydrogen sulfide between stages, and withdrawing water passing from the colder temperature stage to the hotter temperature stage.

13. The method of producing a substance containing concentrated therein an isotope of an element by a plurality of exchange reactions between at least three chemically different substances any two of which are physically separable from each other and each of which is capable of containing said isotope and another isotope of the same element, at least one of said susbtances being a fluid, which comprises exchanging said isotopes between different pairs of said substances in at least three different contact zones, the temperatures in at least two of said contact zones being materially different, maintaining said substances in different phases between each pair of said contact zones, and withdrawining from a point between a pair of said contact zones at least a portion of one of said substances containing concentrated therein said first-mentioned isotope.

14. The method of producing water containing deuterium concentrated therein which comprises exchanging hydrogen and deuterium between (a) water and ammonia in one contact zone, (b) ammonia from said first zone and hydrogen in a second contact zone, and (c) water from said first zone and hydrogen from said second zone in a third contact zone, maintaining substantially different temperature conditions in at least said second and said third contact zones, and withdrawing water substantially enriched in deuterium from a point between said first and said third zones.

15. The continuous method of producing water containing deuterium concentrated therein which comprises exchanging hydrogen and deuterium between water and ammonia at a predetermined temperature in one contact zone, exchanging hydrogen and deuterium between ammonia from said first zone and hydrogen at a predetermined temperature in a second contact zone, and exchanging hydrogen and deuterium between water from said first zone and hydrogen from said second zone at a predetermined temperature in a third contact zone, maintaining the said predetermined temperature in said second contact zone at a substantially lower level than the respective predetermined temperatures in said first and third contact zones, maintaining a substantially continuous recirculation of ammonia between said first and said second contact zones, maintaining a substantially continuous recirculation of hydrogen between said second and said third zones, introducing feed water into said first zone, and withdrawing as product at least a portion of the water flowing between said first and said third zones.

16. The method of producing a material enriched with respect to a particular isotope of an element which comprises establishing in a countercurrent system a countercurrent flow of two materials that are physically separable from one another, one of said materials being a fluid and each of said materials being capable of containing said particular isotope and another isotope of said element, intimately mixing said two materials to cause an stope exchange reaction to occur wherein said particular isotope in one of said materials is exchanged with another isotope of said element in the other of said materials, maintaining one portion of said system at one temperature and a second portion of said system at a second and different temperature to cause said particular isotope to concentrate to a greater extent in one material in one of said portions in said system than in the same material in the other of said portions of said system, maintaining said two materials in separate phases as they flow between said two portions of said system, and withdrawing as product from one of said portions of said system a material enriched with respect to said particular isotope.

17. The method of producing a material enriched with respect to a particular isotope of an element which comprises establishing in an exchange system an intimate mixture of two materials that are physically separable from one another, one of said materials being a fluid and each of said materials being capable of containing said particular isotope and another isotope of said element to cause an isotope exchange reaction to occur wherein said particular isotope in one of said materials is exchanged with another isotope of said element in the other of said materials, maintaining one portion of said system at one temperature and a second portion of said system at a second and different temperature to cause said particular isotope to concentrate to a greater extent in one material in one of said portions of said system than in the same material in the other of said portions of said system, causing one of said materials to be recycled through both of said portions of said system, causing the other of said materials to flow through both of said portions of said system without recycling, maintaining said two materials in separate phases as they flow between said two portions of said system, and withdrawing from said system as product one of said materials enriched with respect to said particular isotope.

18. The method of producing a material enriched with respect to a particular isotope of an element which comprises establishing in an exchange system an intimate mixture of two materials that are physically separable from one another, one of said materials being a fluid and each of said materials being capable of containing said particular isotope and another isotope of said element to cause an isotope exchange reaction to occur wherein said particular isotope in one of said materials is exchanged with another isotope of said element in the other of said materials, maintaining one portion of said system at one temperature and a second portion of said system at a second and different temperature to cause said particular isotope to concentrate to a greater extent in one material in one of said portions of said system than in the same material in the other of said portions of said system, maintaining said two materials in separate phases between said two portions of said system, continuously feeding one of said materials to said system as a source of said particular isotope, removing a portion of said continuously-fed material from said system as product and removing the remainder of said continuously-fed material from said system as waste.

19. The method of producing a material enriched with respect to a particular isotope of an element which comprises establishing in an exchange system an intimate mixture of two materials that are physically separable from one another, one of said materials being a fluid and each of said materials being capable of containing said particular isotope and another isotope of said element to cause an isotope exchange reaction to occur wherein said particular isotope in one of said materials is exchanged with another isotope of said element in the other of said materials, maintaining one portion of said system at one temperature and a second portion of said system at a second and different temperature to cause said particular isotope to concentrate to a greater extent in one material in one of said portions of said system than in the same material in the other of said portions of said system, maintaining said two materials in separate phases between said two portions of said system, continuously recycling one of said materials through said two portions of said system, continuously feeding the other of said materials to the system as a source of said particular isotope, removing a portion of said continuously fed material from said system as product and withdrawing the remainder of said continuously-fed material from said system as waste.

20. The method of producing a material enriched with respect to a particular isotope of an element which comprises establishing an intimate mixture at a first temperature of a first portion of each of two materials that are physically separable from one another, one of said materials being a fluid and each of said materials being capable of containing said particular isotope and another isotope of said element to cause an isotope exchange reaction to occur wherein said particular isotope in one of said materials is exchanged with another isotope of said element in the other of said materials to enrich said other material with respect to said particular isotope, then physically separating said first portions of said two materials, then establishing an intimate mixture at a second and substantially different temperature of a second portion of said one material and said separated first portion of said other material to produce an exchange of isotopes which enriches said second portion of said one material with respect to said particular isotope.

21. The method of producing a substance containing concentrated therein an isotope of an element which comprises exchanging, at two different temperature stages, two isotopes of an element including said first-mentioned isotope between a liquid and a chemically different gas both of which are capable of containing each of said isotopes, maintaining the pressure within said two temperature stages between atmospheric pressure and 40 atmospheres, separating the liquid and gas between said stages, and withdrawing as product containing said first-mentioned isotope liquid passing from the colder to the hotter of said stages.

22. The method of producing a substance containing deuterium concentrated therein which comprises exchanging, at two different temperature stages, deuterium and hydrogen between chemically different substances which are physically separable from each other and which are capable of containing both deuterium and hydrogen, at least one of said substances being a fluid, maintaining the pressure in said two temperature stages between atmospheric pressure and 40 atmospheres, separating said substances from each other between said stages, and withdrawing, from a point between said stages, one of said substances containing deuterium concentrated therein.

23. The method of producing water containing deuterium concentrated therein which comprises exchanging, at two different temperature stages, deuterium and hydrogen between water and hydrogen sulfide, maintaining the pressure in said two temperature stages between atmospheric pressure and 40 atmospheres, and withdrawing water passing from the colder temperature stage to the hotter temperature stage.

References Cited in the file of this patent

UNITED STATES PATENTS

| | | |
|---|---|---|
| 1,897,996 | Barstow | Feb. 21, 1933 |
| 1,906,467 | Heath | May 2, 1933 |
| 2,204,072 | Dean | June 11, 1940 |
| 2,218,342 | Pegram | Oct. 15, 1940 |